United States Patent
Payne

[15] 3,669,479
[45] June 13, 1972

[54] STRUCTURAL CONNECTIONS

[72] Inventor: Harold A. Payne, 252 Bering Avenue, Toronto, 18 Ontario, Canada

[22] Filed: Nov. 13, 1970

[21] Appl. No.: 89,314

[52] U.S. Cl......287/189.36 C, 287/189.36 D, 287/189.36 F, 287/20.92 D
[51] Int. Cl......................................................F16b 7/04
[58] Field of Search............287/189.36 C, 20.42 R, 20.92 C, 287/20.92 D, 20.92 Y, 20.924, 54 A, 54 B, 54 C, 189.36 F, 189.36 D; 248/243, 245, 246, 247; 108/108, 109, 110, 156, 157, 161

[56] References Cited

UNITED STATES PATENTS

| | | | |
|---|---|---|---|
| 2,280,361 | 4/1942 | Ackerman | 287/189.36 C |
| 3,351,313 | 11/1967 | Guillon | 248/246 |
| 2,321,391 | 6/1943 | Kamin | 287/189.36 C X |
| 2,419,761 | 4/1947 | Bruce | 287/189.36 C X |

Primary Examiner—David J. Williamowsky
Assistant Examiner—Wayne L. Shedd
Attorney—Fetherstonhaugh & Co.

[57] ABSTRACT

A device adapted for connection to a structural element of the type having a longitudinally extending channel formed therein. The device may be used for connecting two or more such structural elements to one another. The device preferably consists of two plate elements which are folded preferably adjacent to side edges to form two pairs of outwardly directed lugs and two pairs of inwardly directed ridges. The device includes clamping means which may be in the form of a clamping screw for pulling the main body portions of the plates together to cause the plates to pivot about the ridges to force the lug members away from one another into locking engagement within the channel structure of one structural element.

8 Claims, 5 Drawing Figures

PATENTED JUN 13 1972

3,669,479

INVENTOR.
HAROLD A. PAYNE

BY Fetherstonhaugh & Co
ATTORNEYS

3,669,479

STRUCTURAL CONNECTIONS

FIELD OF INVENTION

This invention relates to improvements in connector devices for structural elements.

In particular, this invention relates to an improved connecting device which is connectable to structural elements of a type having a longitudinally extending channel formed therein. The connector device is suitable for use in the assembly of folding chairs or the like.

PRIOR ART

Difficulty has long been experienced in attempting to rigidly secure structural elements without welding the elements to one another. The main problem with welding is that it is so permanent that components of an assembly cannot be replaced when damaged or worn so that the entire assembly must be replaced.

SUMMARY

The present invention provides a simple and inexpensive form of connecting device for connecting two structural elements to one another. The device is sufficiently simple to be fitted by means of a screwdriver or the like so that the structural elements can be secured without requiring any welding or riveting apparatus. The device is particularly suitable for clamping together two structural elements which have longitudinally extending dovetail shaped channels formed therein to receive the clamping lugs of the clamping device.

According to an embodiment of the present invention, a connecting device for use in connecting two structural elements of the type having channel shaped recesses formed therein comprises, two plate members formed from resilient material such as sheet metal and having generally planar main body portions. Each of the plate members is folded adjacent at least one edge so as to provide a pair of oppositely disposed outwardly projecting lugs for engagement with the channel shaped recesses of a structural member. Each of the plates is also folded adjacent the lugs to provide one pair of longitudinally extending ridges which project inwardly between the plates to abut one another. The plates are also folded at a point spaced from the first fold to provide a second pair of ridges which cooperate with one another and the first pair of ridges to retain the plates in a spaced parallel relationship. The device also includes clamping means adapted to engage the main body portions of each plate so as to force the main body portions towards one another and thereby cause the plates to pivot about the abutting ridge portions such that the lug members are forced outwardly away from one another into clamping engagement with the walls of the channel shaped recess of two structural elements to retain the structural elements in a fixed position relative to one another.

PREFERRED EMBODIMENT

The invention will be more clearly understood after reference to the following detailed specification read in conjunction with the drawings, wherein FIG. 1 is a pictorial view of a chair utilizing the connecting devices and structural elements of the present invention;

Figure 1:
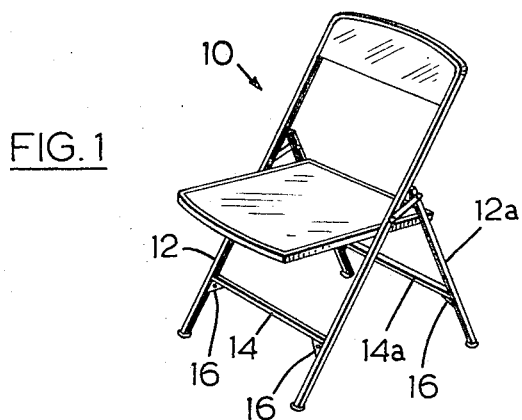

With reference to FIG. 1 of the drawings, the reference numeral 10 refers generally to a folding chair structure which includes a U-shaped structural element 12 which forms a back support and the front legs of the chair. The front leg portions of the structure are connected to a cross bar 14 by a pair of connecting devices 16. A similar cross bar 14a is connected to the back legs 12a by connecting devices 16.

Figure 2:
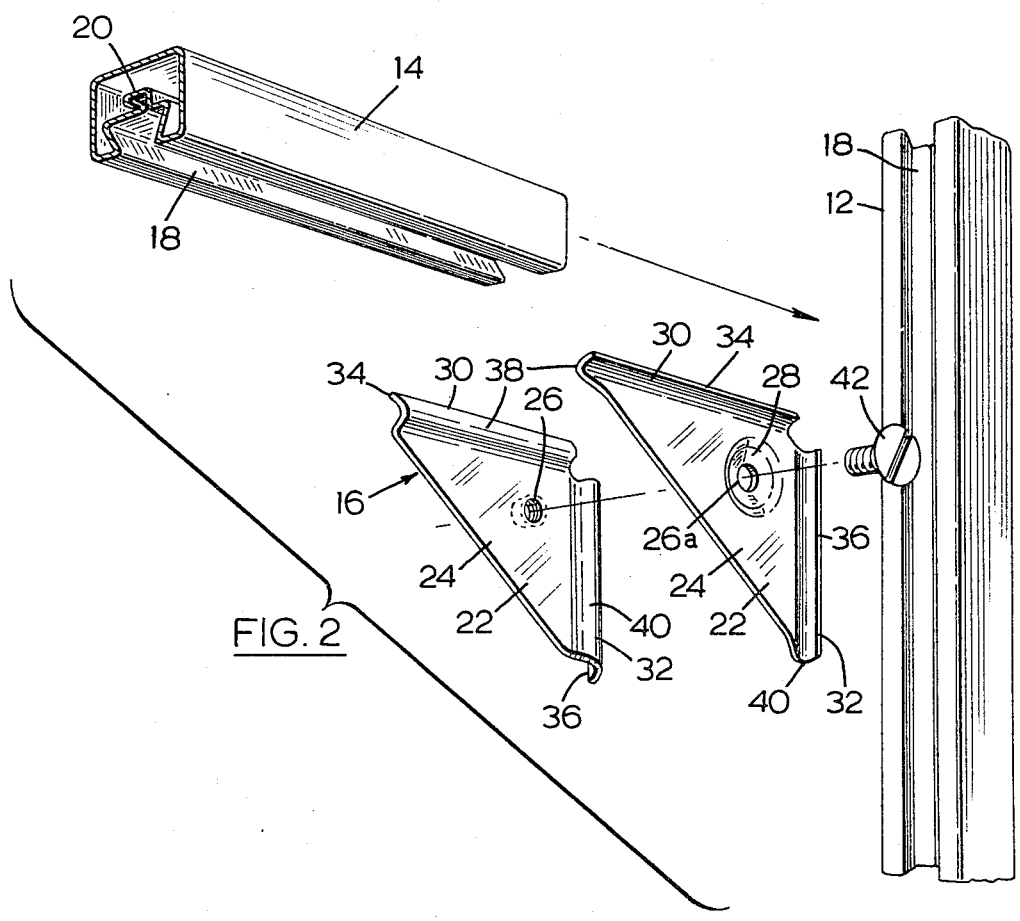
FIG. 2 is an exploded detailed view of the connecting device and structural elements of FIG. 1.

Referring to FIG. 2 of the drawings, it will be seen that each of the structural elements 12 and 14 are formed from a hollow rolled steel tubular component which is formed with a dovetailed shaped longitudinally extending channel 18. The channel shaped configuration is locked by a folded locking structure illustrated at 20 so that there is a substantial resistance to the opening out of the channel by spreading the dovetail configuration.

Figure 3:
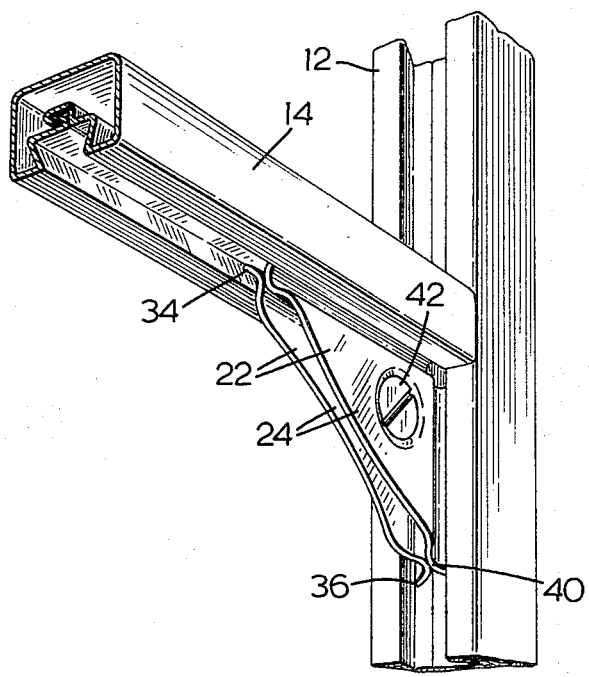
FIG. 3 is an assembled view of the components of FIG. 2.
Figure 4:
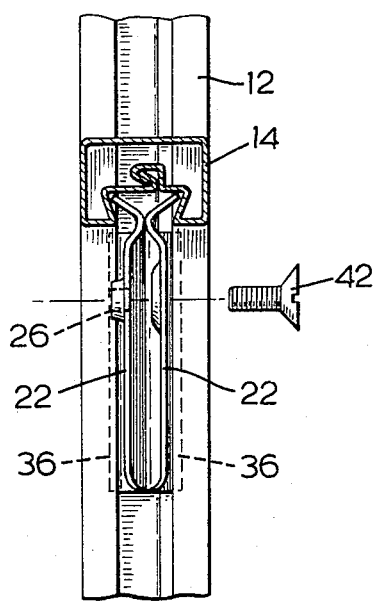
FIG. 4 is an end view of the device of FIG. 3 with the clamping screw removed.
Figure 5:
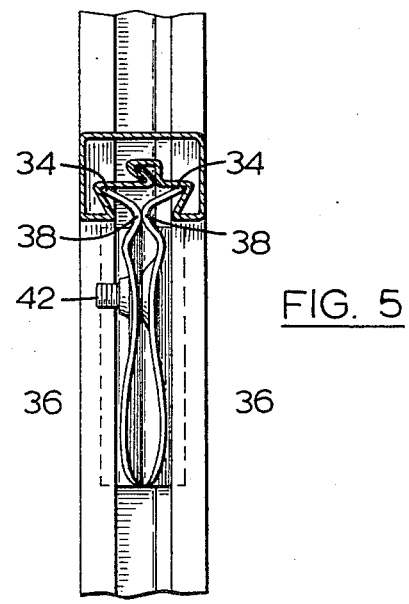
FIG. 5 is a sectional view similar to FIG. 4 illustrating the clamping action of the connecting device.

The connecting devices 16 each comprise a pair of triangular shaped plates 22 which have generally planar main body portions 24. One of the main body portions 24 is formed with a threaded passageway 26 and the other is formed with a passageway 26a arranged to be in alignment with the passageway 26 when the plates are disposed in a face to face relationship described hereinafter. A countersunk recess 28 is formed in the plate with the clearance passage 26a by forming a depression in the area surrounding the passage 26a. Each of the plates 22 is folded along opposite side edges 30 and 32 so as to form outwardly projecting lugs 34 and 36 and inwardly projecting ridges 38 and 40. To assemble the structure illustrated in FIG. 2, the plates 22 are located with the lugs 36 in the channel 18 of the element 12 and the lugs 34 in the channel 18 of the element 14 in the configuration shown in FIG. 4 of the drawings. In this condition, the lugs 34 and 36 do not hold the assembly in a fixed relationship. The clamping screw 42 is then fitted through the passageway 26a to threadably engage the passage 26 so as to pull the planar portions of the plate towards one another to the configuration shown in FIG. 5 and thereby cause the plates to pivot about the abutting ridges 38 and 40. The plates pivot about the ridges 38 and 40 in the manner of a pair of "first class" levers such that the lugs 34 and 36 move outwardly away from one another into clamping engagement with the walls of the dovetail channel of each structural element so as to lock the elements 12 and 14 in the configuration shown in FIG. 3 of the drawings. This form of clamping device is particularly suitable for use in a dovetail channel as the clamping takes place at the outer edges of the assembly such that the clamping edges can expand into the undercut portions of the channel. The connecting device may be released by releasing the clamping crew 24 so as to permit the resilient plate elements to return to approximately their original configuration. In some applications, it may be desirable to make the joint semi-permanent and this may be done by riveting the end of the screw 42 in position.

The rectangular configuration of the connecting device is particularly convenient as it provides a connecting device for connecting two dovetailed structural elements at an angle to one another. The device permits one end of all of the structural elements to be placed in close proximity to the other element so as to cooperate with the connecting device to add rigidity to the assembled structure. The triangular connectors are particularly suitable for use as ties or struts in connecting structural elements.

It will be understood that the plates may have a square or rectangular configuration with the clamping edges disposed in spaced parallel relationship to one another so that the connecting device may act as a hanger or tie member between two spaced apart structural elements.

In addition, the connection formed between the two plate elements may be adapted so as to provide only one pair of clamping lugs in an application where the object is to anchor the devide in the channel shaped slot at one end only. In this type of installation, two plates are again required and both plates are formed to provide a ridge and an outwardly projecting lug in a spaced parallel relationship at one edge of each plate. At a short distance from the first ridge, there is provided a second pair of ridges. A clamping screw is provided for forcing the portions of the plates disposed between the two sets of ridges towards one another so as to cause the one lug to move outwardly from the other in the manner previously described with reference to the drawings. This type of construction may be employed where it is required to connect two elements which are spaced a substantial distance from one another and in which case it is not necessary to have two plates extending the full distance between the two components which are to be connected.

With these and other modifications, it will be apparent that the present invention will be apparent to those skilled in the art without departing from the scope of this invention. For example, the plate elements may be made from a semi-rigid plastic material and the tubular elements may be made from extruded plastic.

In a further modification of this invention, a single clamping screw 42 may be replaced by two or more clamping screws disposed at spaced locations in the main body portion of the device.

In a still further modification, the clamping edges may be formed at each of the three side edges of the triangular element and in a four sided construction, the clamping edge may be formed at each of the sides of each plate.

While the connector is shown in use in a chair assembly in FIG. 1, it will be understood that it may be employed in any assembly using structural elements which are formed with longitudinal channels. For example, the device could be used to secure the rungs of a ladder or to secure the top of a bench or table to the legs.

It will be apparent from the foregoing description of this invention that the connecting device of the present invention is simple and inexpensive to manufacture and it provides a very effective structure for securing components formed with longitudinally extending anchoring channels. A structure incorporating the triangular device as a corner piece may have a rigid configuration which forms a strut or tie element between the two tubular members.

What I claim as my invention is:

1. A connecting device for use in connecting structural elements of the type having channel-shaped recesses formed therein, comprising
   a. two plate members formed from a resilient material and having generally planar main body portions disposed in a spaced face-to-face relationship,
   b. lug means formed at each of two side edges of each of said plate members and projecting laterally therefrom in a direction away from the adjacent plate, the lug means of one plate being disposed generally opposite the lug means of the other plate in a spaced parallel relationship to provide two pairs of outwardly directed lugs,
   c. ridge means formed in each plate adjacent to and projecting from the opposite side of said plate from each of said lug means, each of said ridges having a convex shaped surface extending between said spaced plates and bearing against a convex surface of a ridge of the oppositely disposed plate to maintain said main body portions in a spaced relationship,
   d. clamping means adapted to engage the medial body portions of each of said plates, said clamping means being operable to force said engaged portions inwardly towards one another such that the plates pivot about said convex surfaces of said ridge means and thereby cause the lugs of each pair of lugs to move outwardly from one another into clamping engagement within a channel of a structural element in use.

2. A connecting device as claimed in claim 2 wherein said lug means are formed by bending each of said plate means outwardly at said side edges.

3. A connecting device as claimed in claim 3 wherein said ridge means is formed by bending the portions of said plates adjacent said side edges inwardly of the main body portions thereof to provide an inwardly projecting ridge at each of said side edges.

4. A connecting device as claimed in claim 4 wherein each of said plate members is triangular.

5. A connecting device as claimed in Claim 2, wherein said clamping means comprises a clamping screw having a body portion adapted to extend through a clearance passage in said other plate to threadably engage a threaded passage in said one plate, said clamping screw having head portions engaging the plate which has the clearance passage therein such that said clamping screw may be rotated to pull said main body portion of said plates together to expand said clamping edges as aforesaid.

6. A connecting device for use in connecting structural elements of the type having channel-shaped recesses formed therein comprising,
   a. two triangular shaped plate members formed from resilient sheet metal and having generally planar main body portions disposed in a spaced face-to-face relationship,
   b. lug means formed at each of two side edges of each of said plates by folding the two side edge portions of said plates laterally in a direction away from the adjacent plate, the lug means of one plate being disposed generally opposite to the lug means of the other plate in spaced parallel relationship to provide two pairs of outwardly directed lugs,
   c. ridge means formed adjacent to and projecting from the opposite side of said plate from each of said lug means and extending between said spaced plates, said ridge comprising a reverse bend in each plate extending towards the other plate, said ridge having an inwardly directed surface which has a convex curvature and which extends parallel to each lug means, the inwardly directed convex surface of the ridge means of one plate abutting the inwardly directed convex surface of the ridge means of the other plate so as to maintain said plates in a spaced face-to-face relationship,
   d. clamping means adapted to engage the medial body portions of each of said plates, said clamping means being operable to force said main body portions inwardly towards one another such that the plates pivot about said convex surfaces of said ridge means and thereby cause the lug means of each pair of lugs to move outwardly from one another into clamping engagement within a channel shaped recess of a structural element in use.

7. In combination, a pair of structural elements each having longitudinally extending dovetail-shaped channels formed therein and a connecting device comprising
   a. two plate members formed from a resilient material and having generally planar main body portions disposed in a spaced face-to-face relationship,
   b. lug means formed at each of two side edges of each of said plate members and projecting laterally therefrom in a direction away from the adjacent plate, the lug means of one plate being disposed generally opposite the lug means of the other plate in a spaced parallel relationship to provide two pairs of outwardly directed lugs,
   c. ridge means formed in each plate adjacent to and projecting from the opposite side of said plate from each of said lug means, each of said ridges having a convex shaped surface extending between said spaced plates and bearing against a convex surface of a ridge of the oppositely disposed plate to maintain said main body portions in a spaced relationship,
   d. clamping means engaging the medial body portions of each of said plates, said clamping means forcing said engaged portions inwardly towards one another such that the plates pivot about said convex surfaces of said ridge means and the lugs of each pair of lugs engage the structural element within the dovetail channels formed in two of said structural elements and secure said structural elements to one another.

8. In a structural joint for use in a furniture construction, the improvement of frame structural elements formed from rolled steel tubular members, each having a dovetail-shaped longitudinally extending channel formed therein and a plurality of connecting devices for use in connecting said structural elements comprising,
   a. two plate members formed from a resilient material and having generally planar main body portions disposed in a spaced face-to-face relationship, b. lug means formed at each of two side edges of each of said plate members and projecting laterally therefrom in a direction away from the adjacent plate, the lug means of one plate being disposed generally opposite the lug means of the other plate in a spaced parallel relationship to provide two pairs of outwardly directed lugs, c. ridge means formed in each plate adjacent to and projecting from the opposite side of said plate from each of said lug means, each of said ridges having a convex shaped surface extending between said spaced plates and bearing against a convex surface of a ridge of the oppositely disposed plate to maintain said main body portions in a spaced relationship, d. clamping means engaging the medial body portions of each of said plates, said clamping means forcing said engaged portions inwardly towards one another such that the plates pivot about said convex surfaces of said ridge means and the lugs of each pair of lugs engage the tubular members within the dovetail channels formed therein and secure said tubular elements to one another.

* * * * *